United States Patent [19]
Szymanis

[11] 4,318,268
[45] Mar. 9, 1982

[54] MULCHING LAWN MOWER
[75] Inventor: Edward Szymanis, Midhurst, Canada
[73] Assignee: Canadian General Electric Company Limited, Toronto, Canada
[21] Appl. No.: 158,158
[22] Filed: Jun. 10, 1980

Related U.S. Application Data

[63] Continuation of Ser. No. 40,696, May 21, 1979, abandoned.

[30] Foreign Application Priority Data

Aug. 31, 1978 [CA] Canada ............................... 310440

[51] Int. Cl.³ ............................................. A01D 55/18
[52] U.S. Cl. ........................................ 56/255; 56/295
[58] Field of Search ...................... 56/13.3, 13.4, 255, 56/295, 320.2; 30/347

[56] References Cited

U.S. PATENT DOCUMENTS

| | | | |
|---|---|---|---|
| 3,085,386 | 4/1963 | Slemmons | 56/13.4 |
| 3,790,094 | 2/1974 | Spicer | 56/13.3 |
| 3,795,095 | 3/1974 | Erkkson et al. | 56/320.2 |
| 4,087,955 | 5/1978 | Szymanis | 56/13.4 |
| 4,134,249 | 1/1979 | Wuerker et al. | 56/295 |

Primary Examiner—Robert A. Hafer
Attorney, Agent, or Firm—Raymond A. Eckersley

[57] ABSTRACT

A chuteless rotary scything mulching lawn mower is described which is particularly adapted to be powered by an electric motor including sealed motors. The cutting chamber includes a toroidal portion bounded by concentric skirt walls wherein the cross sectional area of the toroid increases towards the inner skirt. The inner skirt slopes downwardly towards the axis of the cutting blade, and terminates close thereto so as to reduce air leakage from the toroid. Air passage openings are provided into the housing on the axial side of the inner skirt through which cooling air is drawn for the motor. This air stream combines with air from the toroidal chamber which is redirected by the inner skirt wall to distribute grass cuttings over a comminuting portion of the blade. The blade is sharpened to a chisel edge along the upper surface thereof, the bevelled surface of the chisel edge functioning as an air propelling surface. The efficiency of the housing permits blades with less twist to be employed, reducing the incidence of blade cracking.

18 Claims, 9 Drawing Figures

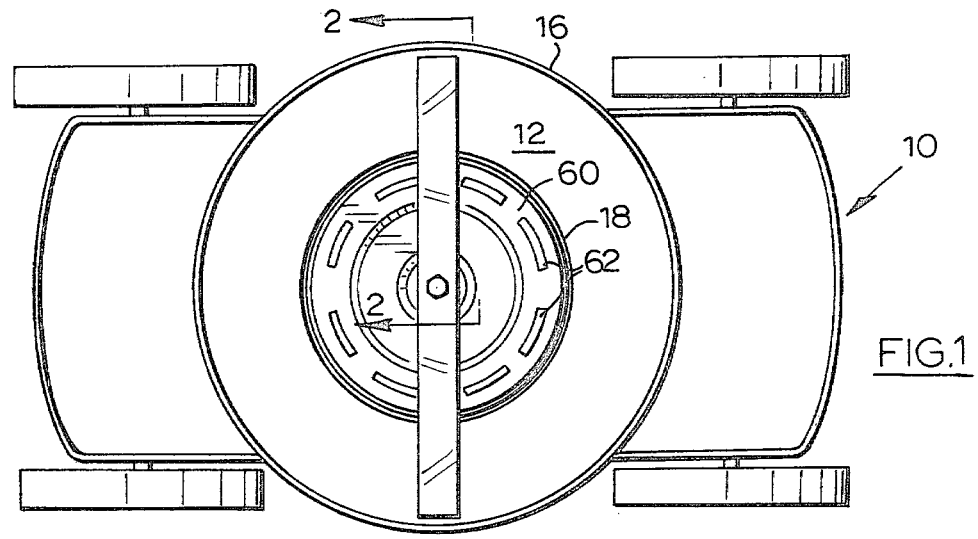
FIG.1
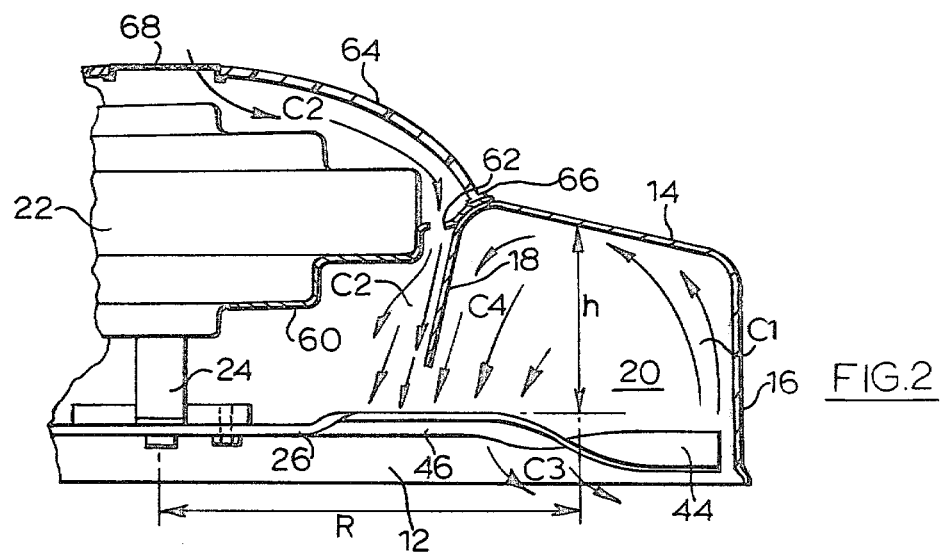
FIG.2
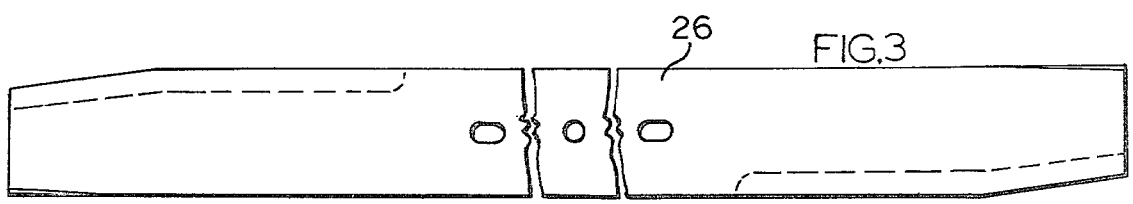
FIG.3
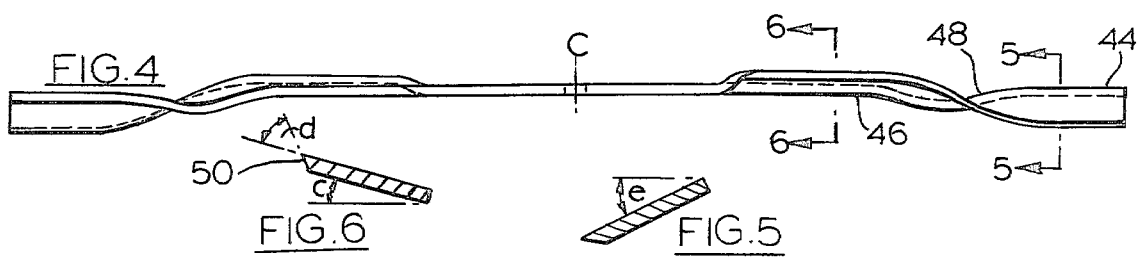
FIG.4
FIG.6
FIG.5

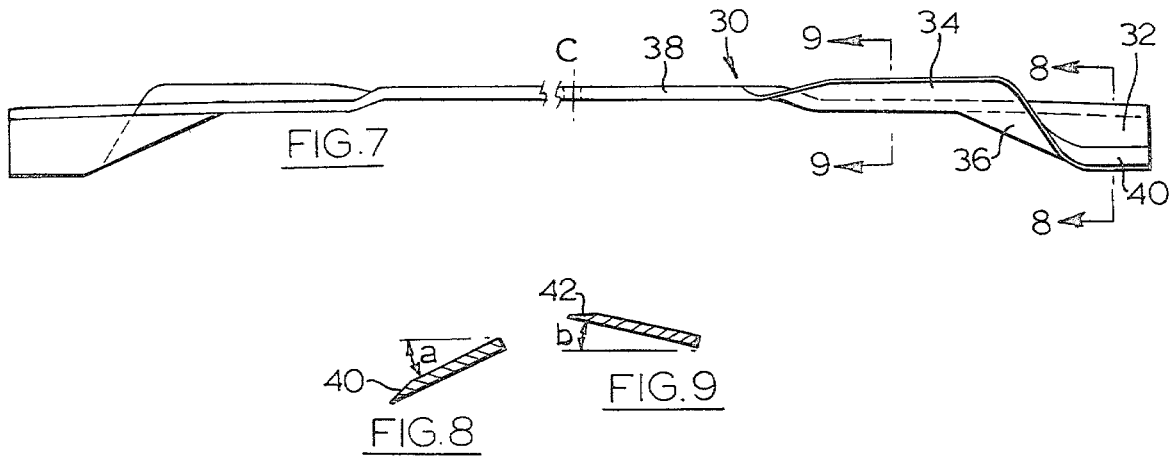

MULCHING LAWN MOWER

This application is a continuation of application Ser. No. 40,696, filed May 21, 1979, now abandoned.

This invention relates to lawn mowers particularly of the rotary scythe type. Still more particularly it relates to chuteless lawn mowers wherein grass cuttings are comminuted to a fine mulch and deposited from beneath the cutting chamber of the lawn mower onto the lawn. Still further, it relates to lawn mowers of the above type wherein the motive source is an electric motor.

Various types of mulching lawn mowers have been proposed in the prior art, and several different mulching lawn mowers are currently marketed. There are numerous advantages attaching thereto, most of which are recognized by the prior art. From an ecological viewpoint, the mulched grass particles form a good nutrient source for the grass, and if they are finely comminuted they decompose quickly and do not contribute to a build up of thatch as do the non-mulched cuttings. From a safety view-point, a mulching lawn mower may be constructed without any discharge chute, thereby reducing the danger of accidental injury resulting from contact with the cutting blade or hard objects ejected from the cutting chamber. In the commercial embodiments of chuteless mulching lawn mowers, mulching is effected by suspending the grass cuttings in a spiralling current of air within a toroidal portion of the cutting chamber of the lawn mower so that they are scythed by the cutting edge of the blade a plurality of times prior to dropping back onto the cut surface of the lawn. It will be appreciated that the retention of grass cuttings within the cutting chamber, and their being cut a plurality of times in the mulching process, imposes a greater load on the motor driving the blade than does a comparable non-mulching lawn mower wherein the cuttings are expelled from the cutting chamber within a quarter to a half cycle of the cutting blade from their being initially cut.

It will be further appreciated that the air currents within the cutting chamber of a chute type non-mulching mower are considerably different from those that will be experienced in a chuteless mulching mower. In the former type there is normally a continuous passage of air across the whole of the underside of the deck, whereas in the latter type there is a relatively small amount of air circulating efficiency is improved by maintaining the air flow in the toroidal zone.

Both of these factors militate against the employment of an electric motor as the prime mover for the cutting blade. The increased load on the blade increases the thermal output from the motor, and the convection currents which might be used to dissipate the heat are substantially reduced beneath the central deck portion where the motor is normally mounted.

Still further, electric motors generally contemplated as being suitable for use with lawn mowers are of two different types, series wound and permanent magnet. The series wound type operates efficiently at a speed that maybe several times that of the cutting blade, and some type of gearing is normally employed to couple the motor and blade. This type of motor may be ventilated relatively efficiently by an internal fan, but without special provisions even this type of motor is not wholly suitable for use in a chuteless mulching mower having a standard swath of 45 cm (18 inches). The permanent magnet motor operates at greater efficiency than that of the series wound electric motor, hence the heat output therefrom would be reduced. A preferred form of the permanent magnet motor is a disc motor, otherwise known as a pancake motor. Suitable motors of this type are described in U.S. Pat. No. 3,979,619—Sept. 7, 1976 and U.S. Pat. No. 4,068,143—Jan. 10, 1978. Preferably such motors rotate at blade speend, hence an internal cooling fan would operate with less efficiency than that of the high speed series motor. Still further it is preferred that the disc type permanent magnet motor be of a totaly enclosed, non-ventilated type (TENV) so as to preclude pick up of ferrous dust by the magnets and generally permitting smaller air gaps and higher efficiency. It will be appreciated that the problems of cooling such relatively slow turning, TENV disc motors are considerable, especially when allied to economic restraints such as apply in the highly competitive field of consumer products. These problems are, then, exacerbated when it is desired to use the motor as a motive source for a ductless mulching mower. As earlier observed the cuttings in a chuteless mulching lawn mower are normally constrained within a toridal volume within the cutting chamber. Commercial embodiments of such lawn mowers appear to be constructed in accordance with certain principles taught in Canadian Pat. No. 726,366—dated Jan. 25, 1966 (Slemons), corresponding to U. S. Pat. No. 3,085,386. The toroidal chamber is there described as being in radial section in a vertical plane semicircular, such that the internal surface is smooth and regular having no internal corners and being uniform in section so that there are no zones wherein the air velocity or the velocity of grass cuttings which either increase or decrease due to housing shape. The toroidal cutting chamber combines with the particular shape of the cutting blade to produce a spiral, circling current of air and grass cuttings. The cutting blade of a typical commercial embodiment comprises a tip portion occupying approximately 15% of the radius of the blade, which is upwardly pitched at an angle of some 25°. By upwardly is meant that the blade slopes upwardly from the forward cutting edge to the rearward trailing flank of the blade. The purpose of so pitching this tip portion of the blade is to provide a strong upward current of air for suspending the grass cuttings within the housing. Also, since there is an appreciable leakage of air from the preferred cutting and comminuting area of the chamber as will be further described, the volume of air to be propelled is high. Intermediate portions of the cutting blade are downwardly pitched at an angle of about 10°. The purpose of this pitched portion of the blade is to reduce leakage from the cutting and comminuting area of the cutting chamber. It will be appreciated that such blade has a twist between the intermediate portion and the end portion of some 35°. With manufacturing tolerances this may well be increased to approximately 40°; moreover, it is desirable that the twist be over a short portion of the blade so as not to reduce the air propelling efficiency of the adjacent sections of the blade. Such blades are normally required to be hot formed and then tempered; they are somewhat susceptible to cracking in the area of the twist both during the forming process and during use. Also, this type of blade is usually found to be more difficult to balance than blades with less severe twist. Further, general practise in the manufacture of all types of rotary sythe cutting blades appears to be to sharpen the lower surface thereof where it intersects the forwardly facing flank of the blade to a chisel edge ie, the blade is normally ground with an upwardly sloping cutting edge. As this practise is applied to a cutting blade of a mulching lawn mower having an upwardly air directing tip portion and a downwardly air directing intermediate portion, the chisel edge of the blade acts in concert with the tip portion to marginally improve the efficiency thereof, but on the contrary detracts from the efficiency of the intermediate portions of the blade.

This invention contemplates improvements to the cutting blade of a rotary scythe mulching lawn mower of the chuteless type and also the cutting blade housing thereof which individually and severally contribut to permit the construction of a commercially feasible electrically powered lawn mower of this type.

In its broadest terms, my invention comprises, in relation to the housing, a toroidal chamber formed from a top wall and a pair of spaced apart skirt walls dependent therefrom. The top wall slopes upwardly towards the inner skirtwall so that the cross sectional area of the toroid increases towards the inner skirt wall. The inner skirt wall slopes downwardly towards the axis of the housing, and desirably terminates within about 20-25 mm from the edge of the lawn mower blade. An air entry path to the interior of the housing is also provided on the axial side of the inner skirt wall, air being propelled therealong by a portion of the lawn mower blade provided for this purpose so as to cool the motor of the lawn mower and then combine with an air stream from the toroidal chamber to distribute grass cuttings entrained therein over the path of a comminuting portion of the blade, where they are reduced to a fine mulch.

As it relates to the cutting blade, at least the comminuting portion of the blade, which serves to draw air downwardly, is sharpened to a chisel edge with a downwardly facing bevel angle, this bevelled surface augmenting the air propelling characteristic of the blade.

My invention will be described in relation to a preferred embodiment thereof, as illustrated in the accompanying drawings wherein FIG. 1 is a plan view of the obverse side of a mulching lawn mower constructed in accordance with the invention.

FIG. 2 is a view along 2—2 of FIG. 1;

FIG. 3 is a plan view of the cutting blade of the instant invention.

FIG. 4 is a side elevation of the cutting blade of FIG. 3;

FIGS. 5 & 6 are views along 5—5 and 6—6 of FIG. 4;

FIG. 7 is a side elevation of a comparable cutting blade of the prior art;

FIGS. 8 and 9 are views along 8—8 and 9—9 of FIG. 7.

Referring now to the Figures in detail, a lawn mower is indicated generally therein by the numeral 10. Lawn mower 10 comprises a cutting chamber 12 having a top wall 14 and an annular skirt wall 16 dependent from the top wall about the periphery thereof. Top wall 14 has an annular inner skirt wall 18 dependent therefrom, the inner skirt wall being generally concentric with skirtwall 16. Skirtwalls 16, 18 and the topwall portion bridging these together enclose a toroidal chamber 20 within cutting chamber 12. The walls enclosing toroidal chamber 20 are essentially imperforate.

Lawn mower 10 further comprises an electric motor 22 having a drive shaft 24 projecting downwardly therefrom. A cutting blade 26 secures directly to drive shaft 24. Motor 22 in this embodiment is a totally enclosed, non-ventilated (TENV) electric motor of the permanent magnet disc rotor type, for example as disclosed more fully in the aforementioned Whiteley patents. Other forms of electric motor maybe used such as, for example, a ventilated disc rotor permanent magnet motor or a series wound universal motor with a gear box, as is conventionally used for lawn mower applications. However, the motor 22 illustrated is believed to present the most difficulty in terms of its adaption for the present use because of the relatively high loading to which it is subject, its low inherent heat loss capacity.

The cutting blade of a chuteless mulching lawn mower of the prior art is illustrated in FIGS. 7, 8 and 9, wherein the blade is represented by the numeral 30. Since it has a rotational axis of symmetry about its centre C, only one half of the blade will be particularly described. Blade 30 has a tip portion 32, an intermediate portion 34, a transitional portion 36 and a central portion 38. Tip portion 32 serves to scythe grass to a desired height as the cutting blade is rotated about the axis C of the blade. For this purpose the forwardly facing flank of this portion of the cutting blade is ground to a chisel edge at 40. Intermediate portion 34 of the blade serves to comminute the grass cuttings so as to form a fine mulch. For this purpose the forwarding facing flank of this portion of the blade is also ground to a chisel edge at 42. In effect, the normal manufacturing process is to grind a continuous bevel along the tip, transitional and intermediate portions of the cutting blade. Tip portion 32 has a further function of propelling a large quantity of air in which the grass cuttings are suspended within a toroidal cutting chamber, and for this purpose this portion of the blade is upwardly twisted at an angle a of about 25°. It will be seen that the bevelled flank of tip portion 32 which forms part of chisel edge 40 is also an upwardly pitched portion of the blade and will itself function as an air propelling surface to augment the upward air flow. Intermediate portion 34 of the cutting blade 30 functions to propel air downwardly to form a recycling air current within the toroidal cutting chamber. For this reason this blade portion is downwardly twisted, normally at an angle of about 10° (angle b). It will be appreciated that if the bevel angle of chisel edge 42 of this portion of the blade is greater than the angle of pitch the bevel edge will reduce the air propelling efficiency of the blade, at least marginally. The transitional portion 36 of the blade is formed with an angle of twist that is the algebraic difference of the angles of twist of the adjacent blade portions 32 and 34 ie, about 35°. It is desired that the distance over which this twist is inserted be relatively small so as not to reduce the air propelling functions of the cutting blade beneath the toroidal cutting zone. As a consequence of the of the radical deformation of the blade it is found to be subject to cracking in this transitional portion.

A preferred embodiment of the cutting blade constructed in accordance with my invention with my invention is shown in FIGS. 3-6, where it is represented generally by the numeral 26. This blade also is symmetrical about a centre axis C, and only the one half thereof is as a consequence described. Cutting blade 26 comprises a tip portion 44, an intermediate portion 46 and a transitional portion 48. The radial proportions of these blade portions are not substantially different from those of the prior art cutting blade 30. Thus tip portion 44 will normally occupy about 15% of the radial length of blade 26. Intermediate portion 46 will not normally locate on central blade portions ie within about 40 to 50% of the radial length of the blade from the axis, for the linear speed of such central portions is generally too low for them to be effective in a comminuting function or as an air propelling function. Transitional blade portion 48 will desirably occupy as small a proportion of the blade length as possible from the point of functional efficiency. However this portion will normally be extended to permit easier forming of the blade and also to reduce the tendency of the blade to crack where it is radically deformed.

The geometry of my cutting blade is novel in that the cutting edge of at least the intermediate portion 46 of the blade is provided by forming a chisel edge 50 on the forwardly facing flank of this portion which is downwardly bevelled in relation to the upper and lower blade surfaces. I have found that when a cutting blade 26 constructed in this manner is employed in combination with the cutting chamber 12 of my invention the angle c at which the intermediate portion 46 of the cutting blade is twisted may be substantially reduced in comparison to the comparable angle b of the prior art. Indeed, good results have been obtained where the angle c is in the range 0°–5°, this being the preferred range. In effect, the downwardly bevelled flank forming chisel edge 50 functions substantially as a downward air propelling surface. The angle d of this bevel edge is not critical, angles in the range of about 25° to 35° being preferred with an angle of about 30° being most suitable. The combination of cutting blade 26 with cutting chamber 12 permits the angle of pitch e of end portion 44 of my blade to be substantially reduced in comparison to the prior art, an angle of 20° being suitable. It will be appreciated that the algebraic difference of pitch between tip portion 44 and intermediate portion 46 to which transitional portion 48 of blade 26 is subject will be normally in the range of about 20° to 25°. This is substantially less than the comparable twist of known embodiments of cutting blades 20 of the prior art. I have also found that the downwardly bevelled angle d of the flank portion forming chisel edge 50 may be continuously formed along portions 44 and 48 of blade 26 without appearing to reduce either the cutting or air propelling efficiency of these portions of the blade.

Returning now particularly to FIG. 2, motor 22 is supported by a motor support 60 which in effect forms part of the enclosing topwall of cutting chamber 12. Motor support 60 is comfortably shaped to the shell casing of motor 22 so as to be in good heat exchange relationship therewith. Motor support 60 is in turn supported from topwall 14 of cutting chamber 12 and may be formed integrally therewith, support 60 and and topwall 14 being desirably in good heat exchange relationship. A plurality of air passage openings 62 are formed in motor support platform 60. Motor 22 is enclosed by a cowl 64 which is generally sealed at the periphery 66 thereof to prevent the ingress of air thereto. One or more openings 68 is provided in cowl 64 adjacent the upper extremity thereof.

Having described the general construction of my chuteless, mulching lawn mower 10 the mode of operation will now be considered. Again with reference to FIG. 2, cutting blade 26 is considered to have the right hand side thereof rotating forwardly out of the plane of the paper. Considering first the action within toroidal chamber 20, a current of air having an upward velocity component as indicated by the arrows C1 will be impelled by tip portion 44 of blade 26. The top wall 14 defining the toroid slops upwardly from the skirt wall 16 to inner skirt wall 18 so that the cross sectional area of the toroid (considering a vertical, radial section as illustrated) increases on approach to the inner skirt wall 18. Inner skirt wall 18 is downwardly angled towards the cutting axis of blade 26. Portions of comminuting edge 50 locate on each radial side of the terminating periphery of skirt wall 18, which approaches the edge 50 quite closely, to within a predetermined distance such as, for example to within 20–35 mm. This value is moderately critical if maximum efficiency is to be attained, for if skirt wall 18 approaches comminuting edge 50 too closely it is found that ridging of the lawn mower surface takes place. If the lower edge of the inner skirt 18 is remote from the comminuting edge 50 of blade 26, there will be a tendency of the air and grass cuttings to escape from toroidal chamber 20 towards the centre of the cutting chamber where the linear velocity of the cutting blade may be too low to comminute the grass cuttings effectively. In the prior art lawn mowers having semicircular sectioned toroidal chambers, this leakage is reduced by impelling a relatively large volume of air downwardly, necessitating the greater degree of downward pitch of intermediate portions 34 of a prior art cutting blade 30 when compared to the lawn mower of any invention, as earlier spoken of. In the present context of providing an electrically powered lawn mower wherein the power input is limited by the line voltage and the voltage drop in the cord connecting the lawn mower to the line power source, every economy in power usage is of considerable importance. The retention of air within toroidal chamber 20 by inner cylinder 18 appears to reduce the amount of air required to be propelled by tip portion 44 of the cutting blade, presumably by the creation of recycling air currents such as indicated by the arrows C3. In general it appears to be desirable to reduce the velocity of air current C1 in comparison to the prior art requirements, so as to provide a greater hold up of grass cuttings above the cutting blade, whereby fluctuations in the amount of cuttings to be comminuted, and hence the peak load on motor 22 are reduced. For this purpose the cross sectional area of toroidal chamber 20 of any lawn mower 10 is appreciably greater than that of the prior art commercial embodiments heretofore. Thus, the ratio of the radius R measured at the mid point of top wall 14 and the height h of the top wall at this mid point above the comminuting edge 50 of blade 26 has normally a value of in the range 1.8–2.3.

An important function of intermediate portion 46 of my cutting blade 26 is to provide a cooling current of air for motor 22, shown as C2. In a TENV motor such as that illustrated this cooling current will perforce flow in heat exchange relationship with the motor casing externally of the motor. Suitable baffles maybe employed to increase the length of the heat exchange flow path. In a ventilated motor, including a motor of the series wound type having an internal air propelling fan, the heat exchange flow path may be at least partially within the motor casing so as to further improve the cooling effect of the air currents C2.

What I claim as new and desire to secure by Letters Patent of the United States is:

1. A chuteless mulching mower of the rotary scythe type having a cutting chamber including a top wall, a pair of concentric spaced apart skirt walls dependent therefrom, said top wall sloping upwardly from the outer of said skirt walls to the inner of said skirt walls, said top wall and said skirt walls together forming a toroidal chamber portion of said cutting chamber, a motor mounted on said cutting chamber in an area thereof generally bounded by said inner skirt wall, a vertical drive shaft from said motor projecting into said cutting chamber, a cutting blade having two radial portions and being secured to said drive shaft to rotate therewith, each radial portion having a tip portion adjacent said outer skirt wall adapted to scythe grass and provide an upward current of air within said toroidal chamber, an intermediate portion extending on each radial side of said inner skirt wall, said intermediate portion being adapted to comminute grass cuttings, said inner skirt wall being downwardly inwardly sloping so as to redirect said upward current of air in said toroidal chamber and grass cuttings entrained therein substantially across the radial path of said intermediate blade portion whereby said grass cuttings are substantially prevented from escaping from the toroidal chamber portion towards the center of the cutting chamber.

2. The lawn mower of claim 1 wherein the inner skirt wall terminates within a predetermined distance of a comminuting edge portion of the cutting blade so as to substantially prevent ridging of lawn surfaces.

3. The lawn mower of claim 1 wherein said toroidal chamber is characterized by the radio R/h having a value in the range 1.8 to 2.3 where h is the height of the mid point of said top wall above said blade and R is the radial distance of said mid point from the axis of said blade.

4. The lawn mower of claim 1 wherein said intermediate portion is located on either radial side of the inner skirt wall, said intermediate portion being adapted to draw a downward current of air thereover which current of air is directed by the inner skirt wall over its axial side so as to combine with the redirected current of air.

5. The lawn mower of claim 4 further including at least one air passage opening to the interior of said cutting chamber bounded by said inner skirt wall, said air passage opening being associated with said motor so that air drawn through said air passage to the interior of said cutting chamber is in heat transfer with said motor, said downward current of air being drawn through said air passage opening.

6. The lawn mower of claim 3 wherein said inner skirt wall terminates within the range of about 20 to about 35 mm above a comminuting edge portion of said cutting blade.

7. The lawn mower of claim 5 wherein said motor comprises an electric motor, said electric motor is a series wound electric motor.

8. The lawn mower of claim 5 wherein said motor comprises an electric motor, said electric motor is a pancake form permanent magnet electric motor.

9. The lawn mower of claim 5 wherein said motor comprises an electric motor said electric motor is a totally enclosed, non-ventilated, permanent magnet electric motor.

10. The lawn mower of claim 1 wherein at least said intermediate portion of said cutting blade has a forwardly facing flank portion thereof sharpened to a chisel edge, said chisel edge having a downwardly directed bevel angle.

11. The lawn mower of claim 10 wherein said chisel edge extends continuously from said intermediate portion to said tip portion.

12. The lawn mower of claim 11 wherein said tip portion is twisted upwardly and said intermediate portion is twisted downwardly, the algebraic difference of the angles of twist being in the range of 20° to 25°.

13. The lawn mower of claim 12 wherein said intermediate portion of said blade is downwardly twisted at an angle of up to about 5°.

14. A cutting blade for use in a rotary scythe mulching lawn mower, said blade including two symmetrical radial blade portions adapted for rotation about a central axis of said blade, each radial portion comprising a tip portion adapted to scythe grass and an intermediate portion adapted to comminute grass, said intermediate portion having a forwardly facing flank portion thereof sharpened to a chisel edge, said chisel edge having a downwardly directed bevel angle, said intermediate portion being downwardly twisted at an angle up to 5°, and said tip portion being downwardly twisted at an angle of about 20°.

15. The blade of claim 14 wherein the directed bevel angle is in the range of about 25° to 35°.

16. The blade of claim 14 wherein the directed bevel angle is about 30°.

17. The blade of claim 14 wherein said chisel edge extends continuously from said intermediate portion to said tip portion.

18. The blade of claim 14 further comprising a transitional portion between subject to an algebraic difference of angles of twist between said tip portion and said intermediate portion in the range of 20° to 25°.

* * * * *